US011084929B2

(12) United States Patent
Jang et al.

(10) Patent No.: US 11,084,929 B2

(45) Date of Patent: Aug. 10, 2021

(54) SILICONE COMPOSITE MATERIAL AND MANUFACTURING METHOD THEREOF

(71) Applicant: LG CHEM, LTD., Seoul (KR)

(72) Inventors: Hyung Sik Jang, Daejeon (KR); Pyeong Gi Kim, Daejeon (KR); Se Hyun Kim, Daejeon (KR); Dong Hyun Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 35 days.

(21) Appl. No.: 16/495,051

(22) PCT Filed: Nov. 28, 2018

(86) PCT No.: PCT/KR2018/014764

§ 371 (c)(1),
(2) Date: Sep. 17, 2019

(87) PCT Pub. No.: WO2019/112227

PCT Pub. Date: Jun. 13, 2019

(65) Prior Publication Data

US 2020/0148882 A1 May 14, 2020

(30) Foreign Application Priority Data

Dec. 8, 2017 (KR) ........................ 10-2017-0167917

(51) Int. Cl.

| | |
|---|---|
| ***C08L 83/04*** | (2006.01) |
| ***C08K 3/013*** | (2018.01) |
| ***C08K 3/04*** | (2006.01) |

(52) U.S. Cl.

CPC .............. *C08L 83/04* (2013.01); *C08K 3/013* (2018.01); *C08K 3/041* (2017.05); *C08K 2201/001* (2013.01); *C08K 2201/003* (2013.01); *C08K 2201/004* (2013.01); *C08K 2201/016* (2013.01); *C08L 2201/00* (2013.01); *C08L 2205/025* (2013.01); *C08L 2312/00* (2013.01)

(58) Field of Classification Search

CPC ................................ C08K 3/041; C08L 83/04
See application file for complete search history.

(56) References Cited

U.S. PATENT DOCUMENTS

| | | | |
|---|---|---|---|
| 9,441,086 | B2 | 9/2016 | Albaugh et al. |
| 9,631,062 | B2 | 4/2017 | Ikeno et al. |
| 10,839,976 | B2 | 11/2020 | Shigeta et al. |
| 2003/0213939 | A1 | 11/2003 | Narayan et al. |
| 2010/0308279 | A1 | 12/2010 | Zhou et al. |
| 2015/0315437 | A1 | 11/2015 | Albaugh et al. |
| 2017/0372815 | A1 | 12/2017 | Grau et al. |
| 2020/0040185 | A1 | 2/2020 | Jang et al. |

FOREIGN PATENT DOCUMENTS

| | | | |
|---|---|---|---|
| CN | 1656574 | A | 8/2005 |
| CN | 104854176 | A | 8/2015 |
| CN | 106589953 | A | 4/2017 |
| CN | 107207861 | A | 9/2017 |
| CN | 107250279 | A | 10/2017 |
| EP | 3059286 | A1 | 8/2016 |
| JP | 2009-508999 | A | 3/2009 |
| JP | 2016-509086 | A | 3/2016 |
| JP | 6023894 | B2 | 11/2016 |
| JP | 2017014399 | A | 1/2017 |
| JP | 2017101168 | A | 6/2017 |
| JP | 2020-515695 | A | 5/2020 |
| KR | 1020040044463 | A | 5/2004 |
| KR | 1020120052922 | A | 5/2012 |
| KR | 1020150053758 | A | 5/2015 |
| KR | 1020160108089 | A | 9/2016 |
| KR | 1020170124540 | A | 11/2017 |
| WO | 2007/035442 | A2 | 3/2007 |
| WO | 2014/099639 | A1 | 6/2014 |
| WO | 2015056374 | A | 4/2015 |

*Primary Examiner* — Wenwen Cai

(74) *Attorney, Agent, or Firm* — Dentons US LLP

(57) ABSTRACT

The present invention provides a silicone composite material having a cured conductive rubber composition containing liquid silicone and carbon nanotubes, wherein the initial viscosity of the liquid silicone and the volume resistance of the silicone composite material satisfy a specific relationship, and when the silicone composite material is provided through the relationship equation, the reproducibility of the volume resistance value is excellent. A silicone composite material manufactured to satisfy the relationship equation is characterized in that the resistance deviation in the composite is small and the appearance properties thereof are excellent.

4 Claims, No Drawings

SILICONE COMPOSITE MATERIAL AND MANUFACTURING METHOD THEREOF

The present application is a national phase entry of International Application No. PCT/KR2018/014764 filed on Nov. 28, 2018, and claims priority to and the benefit of Korean Patent Application No. 10-2017-0167917, filed on Dec. 8, 2017, in the Korean Intellectual Property Office, the disclosures of which are incorporated herein in their entirety by reference.

FIELD

The present invention relates to a silicone composite material in which the relationship between the initial viscosity of liquid silicone and the volume resistance of the silicone composite material is specified, and a manufacturing method thereof.

BACKGROUND ART

A conductive silicone rubber composition comprising curable liquid silicone containing a conductive filler such as carbon black, metal powder, a conductive metal oxide, and the like is included in parts of an electro-photographic device such as a copier, a printer, a plain-paper facsimile machine, a charge roller, a development roller, a phase-change roller and a fixing roller, in the form of a silicone composite material as a molded product to be variously applied.

Volume resistance or specific resistance ρ, known as electrical resistance, is defined as the electrical resistance between opposing surfaces of a material of 1 $m^3$, and it is important that the volume resistance is reproduced within a predetermined range in all of the above applications and that a molded product having a permanent volume resistance value is obtained. However, when a volume resistance value is relatively large, for example, in a range of $10^6$ Ωcm to $10^{12}$ Ωcm, it is difficult to reproduce and form a product having an arbitrarily selected volume resistance value. In addition, the range of volume resistance that may be required for parts of an office automation device is highly variable depending on the device and the shape of the parts thereof. Therefore, there is a need for a simple method capable of adjusting the volume resistance of a silicone composite material cured as a molded product.

In addition, a conductive rubber composition containing carbon black may be damaged during curing, or cause a problem in that the hardness of a cured product is lowered after being stored for a long period of time. Such problems are caused by some properties of carbon black, such as the adsorption property and the presence of both surface active groups and impurities. For example, in a liquid silicone rubber composition, a platinum (Pt) base catalyst may be inactivated due to the adsorption property of carbon black and/or the catalytic activity thereof may be suppressed by carbon black impurities. In addition, an crosslinking agent additive for an additive-curable system, typically organopolysiloxane having silicon-bonded hydrogen, among liquid silicone rubber compositions, can be gradually decomposed due to the effects of surface active groups and/or impurities of carbon black.

Accordingly, there is a need for a method capable of easily adjusting and predicting the volume resistance of a silicone composite material, and furthermore solving problems caused by the addition of a filler such as carbon black

SUMMARY

An aspect of the present invention provides a method of manufacturing a silicone composite material in which the volume resistance of a silicone composite material can be predicted through the initial viscosity of liquid silicone, or in which the relationship between the initial viscosity of liquid silicone and the volume resistance of the silicone composite material is specified such that that the initial viscosity of the liquid silicone required to satisfy the target volume resistance of the silicone composite material is determined, and provides a silicone composite material in which the resistance deviation in the composite is small and the appearance properties of the composite are improved when the relationship is satisfied.

According to an aspect of the present invention, there is provided a silicone composite material which is a cured conductive rubber composition comprising liquid silicone and carbon nanotubes characterized in that, the initial viscosity of the liquid silicone and the volume resistance of the silicone composite material have a relationship represented by Equation 1 below:

$$y = \frac{A}{1 + (x/B)^C} + Dx + E \qquad \text{[Equation 1]}$$

In Equation 1, x is the initial viscosity (cP) of the liquid silicone measured at a shear rate of 10 $s^{-1}$, y is the volume resistivity (Ωcm) of the silicone composite material measured at a voltage of 90 V on a 4-probe, A is −9,999,980, B is 45,000, C is a real number of 18 to 22, D is a real number of 0.001 to 0.0018, and E is 9,999,985.

According to another aspect of the present invention, there is provided a method of manufacturing a silicone composite material, the method including determining an initial viscosity of liquid silicone and a target volume resistance of the silicone composite material according to Equation 1 below; and mixing and curing carbon nanotubes in the liquid silicone having the determined initial viscosity.

The manufacturing method of a silicone composite material according to the present invention has advantages in that the relationship between the initial viscosity of liquid silicone and the volume resistance of a silicone composite material is specified so that the volume resistance of a silicone composite material to be manufactured can be predicted only by the initial viscosity of the liquid silicone, thereby greatly reducing the defect rate in a production process, and in that a silicone composite material of a desired resistance level can be produced without resorting to trial and error. In addition, a silicone composite material satisfying the above relationship may have advantages in that the resistance deviation in the composite is small and the appearance properties of the composite are improved.

DETAILED DESCRIPTION

Hereinafter, the present invention will be described in more detail to facilitate understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

According to an aspect of the present invention, there is provided a silicone composite material having a cured conductive rubber composition containing liquid silicone and carbon nanotubes, wherein the initial viscosity of the liquid silicone and the volume resistance of the silicone composite material have a relationship represented by Equation 1 below.

$$y = \frac{A}{1 + (x/B)^C} + Dx + E \quad \text{[Equation 1]}$$

In Equation 1, x is the initial viscosity (cP) of the liquid silicone measured at a shear rate of $10\ s^{-1}$, y is the volume resistivity (Ωcm) of the silicone composite material measured at a voltage of 90 V on a 4-probe, A is −9,999,980, B is 45,000, C is a real number of 18 to 22, D is a real number of 0.001 to 0.0018, and E is 9,999,985.

The silicone composite may be a state in which a conductive rubber composition is cured, and the conductive rubber composition may refer to a composition in which carbon nanotubes are dispersed in liquid silicone.

According to an embodiment of the present invention, the liquid silicone is an example of a thermosetting resin and may be replaced with a resin such as liquid EPDM, urethane, or modified silicone resin. However, when liquid silicone is used, flame retardancy, heat resistance, and weather resistance may be improved.

The liquid silicone may be classified into one containing silicone rubber and a metal catalyst, and the other containing silicone rubber and a crosslinking agent. Carbon nanotubes may be included in each thereof to form rubber compositions, and through mixing of the rubber compositions, a composition in a paste state before being cured into a conductive rubber composition, that is, a silicone composite material, may be formed.

Specifically, the conductive rubber composition may include a first rubber composition including carbon nanotubes and a first liquid silicone containing a metal catalyst and silicone rubber, and a second rubber composition including carbon nanotubes and a second liquid silicone containing a crosslinking agent and silicone rubber.

The silicone rubber may have a weight average molecular weight of about 1,000 to 800,000 g/mol, and may act as a major factor in selecting the initial viscosity of liquid silicone. According to a desired initial viscosity, the weight average molecular weight may be appropriately selected. In addition, the silicone rubber may be an organosiloxane polymer containing a double bond at the end thereof in general and may be crosslinked by a specific catalyst.

For example, the organosiloxane polymer may be any one of a dimethylvinylsiloxy-terminated copolymer of dimethylvinylsiloxy-terminated dimethylpolysiloxane, methylvinylsiloxane and dimethylsiloxane, a trimethylsiloxy-terminated copolymer of methylvinylsiloxane and dimethylsiloxane, a dimethylvinylsiloxy-terminated copolymer of methylphenylsiloxane and dimethylsiloxane, a dimethylvinylsiloxy-terminated copolymer of methylphenylsiloxane, methylvinylsiloxane, and dimethylsiloxane, a trimethylsiloxy-terminated copolymer of methylphenylsiloxane, methylvinylsiloxane, and dimethylsiloxane, a dimethylvinylsiloxy-terminated copolymer of diphenylsiloxane and dimethylsiloxane, a dimethylvinylsiloxy-terminated copolymer of diphenylsiloxane, methylvinylsiloxane, and dimethylsiloxane, a dimethylvinylsiloxy-terminated copolymer of methyl (3,3,3-trifluoropropyl) siloxane and dimethylsiloxane, or a dimethylvinylsiloxy-terminated copolymer of methyl (3,3,3-trifluoropropyl) siloxane, methylvinylsiloxane, and dimethylsiloxane, and the like, but is not limited thereto.

The metal catalyst may include platinum (Pt) as a metal, for example, fine platinum powder, platinum black, chloroplatic acid, an alcohol-modified chloroplatinic acid, a complex of olefin and chloroflavonic acid, a complex of chloroplatinic acid and alkenyl siloxane, or a thermoplastic resin powder containing the platinum-based catalyst described above. The metal catalyst may be present in an amount of 0.1 to 500 ppm of metal by weight in the liquid silicone.

In addition, the crosslinking agent may include organic polysiloxane having at least two Si—H bonds per molecule, and the Si—H bond may react with a double bond component of the silicone rubber (an organic siloxane polymer) to form crosslinking between polymers.

The crosslinking agent may include one or more of, for example, trimethylsiloxy-terminated polymethylhydrogensiloxane, a trimethylsiloxy-terminated copolymer of methylhydrogensiloxane and dimethylsiloxane, a dimethylhydrogensiloxy-terminated copolymer of dimethylhydrogensiloxane and dimethylsiloxane, a cyclic copolymer of methylhydrogensiloxane and dimethylsiloxane, organopolysiloxane consisting of cyclic polymethylhydrogensiloxane, a siloxane unit of the formula $(CH_3)_3SO_{1/2}$, a siloxane unit of the formula $SiO_{4/2}$, and a siloxane unit of the formula $(CH_3)_2HSiO_{1/2}$, organopolysiloxane consisting of a siloxane unit of the formula $(CH_3)_2HSiO_{1/2}$, and a siloxane unit of the formula $CH_3SiO_{3/2}$, organopolysiloxane consisting of a siloxane unit of the formula $(CH_3)_2HSiO_{1/2}$, a siloxane unit of the formula $(CH_3)_2SiO_{2/2}$, and a siloxane unit of $SiH_3SiO_{3/2}$, dimethylhydrogensiloxy-terminated polydimethylsiloxane, a dimethylhydrogensiloxy-terminated copolymer of methylphenylsiloxane and dimethylsiloxane, and/or a dimethylhydrogensiloxy-terminated copolymer of methyl (3,3,3-trifluoropropyl) siloxane, and dimethylsiloxane.

As described above, the first liquid silicone may contain silicone rubber and a metal catalyst, and the second liquid silicone may contain silicone rubber and a crosslinking agent. In addition, carbon nanotubes may be included in each of the first liquid silicone and the second liquid silicone to form the first rubber composition and the second rubber composition.

Here, the first liquid silicone and the second liquid silicone may have an initial viscosity of about 5,000 to 90,000 cP, and may be in the range of x in Equation 1. In addition, although the initial viscosity of the liquid silicone is not limited, when the upper limit value thereof is 60,000 cP, more preferably 40,000 cP, most preferably 30,000 cP, the volume resistance predicted by Equation 1 may be more accurate, and when liquid silicone having the viscosity in the above range is used, the chain length of a silicone polymer may be appropriate to have basic properties such as elasticity and may not adversely affect equipment while being processed into a composite.

In addition, the first rubber composition and the second rubber composition may each have a viscosity of 80,000 to 180,000 cP, which may be related to the content of carbon nanotubes. When the viscosity of the rubber compositions is in the above range, processibility may be excellent.

According to an embodiment of the present invention, the initial viscosity of the liquid silicone and the volume resistance of the silicone composite material have the relationship represented by Equation 1 below.

$$y = \frac{A}{1 + (x/B)^C} + Dx + E \quad \text{[Equation 1]}$$

In Equation 1, x is the initial viscosity (cP) of the liquid silicone measured at a shear rate of 10 $s^{-1}$, y is the volume resistivity (Ωcm) of the silicone composite material measured at a voltage of 90 V on a 4-probe, A is −9,999,980, B is 45,000, C is a real number of 18 to 22, D is a real number of 0.001 to 0.0018, and E is 9,999,985.

As described above, x may be 5,000 to 90,000, and the preferred range thereof is as described above, wherein y which corresponds to the volume resistance (Ωcm) may be 1 to $10^8$, preferably, 1 to $10^7$, more preferably 1 to $10^4$. The volume resistance the silicone composite material represented by the y value may be evaluated as preferably being lower. However, in some cases, the volume resistance may need to be greater than a specific value. However, if the volume resistance exceeds $10^8$, it may be difficult to be applied as a silicone composite, and when substituted into Equation 1 according to the present invention, the accuracy may be improved if the volume resistance is in the preferable range.

In addition, among A to E values indicated by the above constants, the values of C and D may be variable. C may have a value of 18 to 22, preferably 19 to 21, more preferably 20 to improve the accuracy of the equation, and D may have a real number value between 0.001 and 0.0018, preferably 0.001 and 0.0015, and most preferably 0.0012 and 0.0013 to improve the accuracy of the equation.

In the case of a silicone composite material manufactured to satisfy the relationship of the above Equation 1, since carbon nanotubes are used as a conductive filler, not only a considerably low volume resistance value may be achieved even with a small amount thereof, but also the resistance deviation in the composite is small and the improvement of physical properties such as appearance properties of the composite may be achieved. In addition, when the volume resistance value of a manufactured silicone composite material is known, it is possible to predict the initial viscosity of liquid silicone, and accordingly, a silicone composite material having the same volume resistance value may be provided with high reproducibility.

Meanwhile, when carbon black, not carbon nanotube, is used as a conductive filler, the amount thereof needed to achieve a required volume resistance value may be substantial, and accordingly, the viscosity of the rubber composition is greatly increased, causing a problem in which processibility is deteriorated.

However, according to an embodiment of the present invention, the carbon nanotubes may be included in an amount of 0.5 to 3 parts by weight based on 100 parts by weight of liquid silicone, preferably 0.7 to 2 parts by weight, more preferably 0.7 to 1.5 parts by weight. When carbon nanotubes are included in the above range, the viscosity of a conductive rubber composition may be achieved within the range described above, so that processibility may be excellent. Furthermore, the reliability of the relationship between the initial viscosity of liquid silicone and the volume resistance of a silicone composite material identified through the Equation 1 may be further improved.

In other words, when the content of carbon nanotubes exceeds 3 parts by weight, there may be a somewhat large error between the relationship according to the equation and an experimental value. When added in an amount smaller than 0.5 parts by weight, since a change to such an extent as to reflect the above equation may not occur, when the content of the carbon nanotubes is adjusted to be within the above range, the volume resistance of a silicone composite material may be more accurately and easily predicted through the initial viscosity of liquid silicone.

The carbon nanotube may be, for example, a multi-walled carbon nanotube. The carbon nanotube is not specifically limited, and any one of a single-walled carbon nanotube and a multi-walled carbon nanotube such as a double-walled carbon nanotube may be used. The carbon nanotube may be prepared by, for example, an arc discharge method, a laser evaporation method, a chemical vapor deposition method, a hydrocarbon catalytic decomposition method, and the like. When the aspect ratio of carbon nanotube is large, dispersibility may be deteriorated since it is difficult to untie carbon nanotube entangled in a bindle state. The aspect ratio of carbon nanotube is not particularly limited, but may be preferably, for example, to be in the range of 5 to 10,000.

The first rubber composition and the second rubber composition are mixed to form a conductive rubber composition paste, and the paste may be cured to form a silicone composite material. The conductive rubber composition may contain 5 to 95 wt % of the first rubber composition and 5 to 95 wt % of the second rubber composition, preferably 10 to 90 wt % and 90 to 10 wt % respectively, more preferably 30 to 70 wt % and 70 to 30 wt % respectively, most preferably 40 to 60 wt % and 60 to 40 wt % respectively. In some cases, since the content between a catalyst and a crosslinking agent needs to be appropriately adjusted, the mixing ratio of the two rubber compositions needs to be appropriately controlled.

That is, when the content of either a crosslinking agent or a catalyst is greater, for example, when the amount of the crosslinking agent is greater than that of the catalyst, there may be a material for causing a crosslinking reaction, but conditions are not sufficient, and when the amount of the catalyst is greater than that of the crosslinking agent, conditioned are satisfactory, but materials are somewhat lacking.

According to another embodiment of the present invention, the silicone composite material is a silicone composite material in which a conductive rubber containing liquid silicone and carbon nanotubes is cured, wherein the initial viscosity of the liquid silicone and the volume resistance of the silicone composite material have a relationship represented by Equation 1 below, and the carbon nanotubes has a diameter of 5 to 100 nm and an aspect ratio of 5 to 10,000, and form secondary agglomerated carbon nanotubes by agglomerating non-linear state carbon nanotubes in which a graphite layer is stretched in a direction parallel to a fiber axis, and the secondary agglomerated carbon nanotubes have a diameter of 0.1 μm or more, a length of 5 μm or more, and a ratio of long diameter to short diameter of 5 or more.

$$y = \frac{A}{1 + (x/B)^C} + Dx + E \quad \text{[Equation 1]}$$

In Equation 1, x is the initial viscosity (cP) of the liquid silicone measured at a shear rate of 10 $s^{-1}$, y is the volume resistivity (Ωcm) of the silicone composite material measured at a voltage of 90 V on a 4-probe, A is −9,999,980, B is 45,000, C is a real number of 18 to 22, D is a real number of 0.001 to 0.0018, and E is 9,999,985.

The carbon nanotubes may have, for example, a shape of secondary agglomerated carbon nanotubes in which primary carbon nanotubes are agglomerated. In this case, since the shape of the primary carbon nanotubes is in a non-linear state, the cohesive force may be stronger when agglomerated to the secondary carbon nanotubes, and since the frequency of disconnection is reduced when compared with a case in which the network among carbon nanotubes is linear, so that even with a small amount, an effect of high conductive may be expressed.

In addition, the primary carbon nanotubes may have a diameter of 5 to 100 nm, preferably 5 to 70 nm. In addition, the primary carbon nanotubes may have an aspect ratio of 5 to 10,000, and the diameter and length of the carbon nanotubes may be measured through an electron microscope. When the carbon nanotubes have a diameter and an aspect ratio as described above, when agglomerated to secondary carbon nanotubes, an orientation property may be obtained. When the orientation property is obtained, there may be an advantage in that an effect of high conductivity may be achieved even with a small amount.

In addition, the primary carbon nanotube may be one in which a graphite layer is stretched substantially parallel to a fiber axis, and here, being parallel may mean that the slope of the graphite layer with respect to the fiber axis is within about ±15 degrees, and the graphite layer is a graphene sheet constituting a carbon fiber and may be observed as a stripe in an electron microscope (TEM) photograph.

The length of the graphite layer is preferably 0.02 to 15 times the diameter of the carbon nanotube, and the shorter the length of the graphite layer, the stronger the adhesion strength to silicone rubber when mixed with liquid silicone, so that it is possible to improve the mechanical strength of a silicone composite material. The length of the graphite layer and the slope of the graphite layer may be measured by observation of an electron microscope photograph and the like.

It may be preferable that the primary carbon nanotubes are agglomerated to have the form of secondary agglomerated carbon nanotubes. The structure of the carbon nanotube agglomerate may be specified by observing an electron microscope photograph, and the diameter, length and the like may be specified by using the average of several tens to several hundreds of carbon nanotube agglomerates observed using an electron microscope photograph.

The secondary agglomerated carbon nanotubes have a diameter of typically 0.1 to 100 μm, preferably 1 to 100 μm, more preferably 5 to 100 μm, still more preferably 10 to 50 μm, and the secondary agglomerated carbon nanotubes have a length of typically 5 to 500 μm, preferably 10 to 500 μm, and more preferably 20 to 200 μm. The length and diameter of such a range may be preferable in aligning the secondary carbon nanotubes, and may be more preferable in easily forming a highly dispersed state.

The secondary agglomerated carbon nanotubes may have a greater conductivity imparting effect as the ratio of long diameter to short diameter is larger. The ratio of long diameter to short diameter may be at least 3, preferably 5 or greater, and more preferably 7 or greater. The short diameter is preferably 50 μm or greater, more preferably 100 μm or greater, and even more preferably 300 μm or greater.

According to another aspect of the present invention, there is provided a method of manufacturing a silicone composite material, the method including determining an initial viscosity of liquid silicone and a target volume resistance of the silicone composite material according to Equation 1 below; and mixing and curing carbon nanotube in the liquid silicone having the determined initial viscosity.

The description of materials such as carbon nanotubes and liquid silicone is the same as those described above, and thus the description thereof is omitted.

When the method according to the present invention is utilized, a silicone composite material having a desired volume resistance value may be manufactured without trial and error, and as described above, by predicting the initial viscosity of liquid silicone through the volume resistance value of the manufactured silicone composite material, a silicone composite material having the same volume resistance value may be manufactured with high reproducibility.

The curing of the conductive rubber composition is not particularly limited, and may be performed through a process of heat treatment at a predetermined temperature for a predetermined period of time. For example, the curing may be performed at a temperature of 150° C. or higher, preferably at 170° C. or higher, more preferably at 180° C. or higher, and may be performed for 10 minutes or more, preferably for 30 minutes or more, more preferably for 50 minutes or more. However, the curing conditions may be applied appropriately such that when the curing temperature is low, the curing time may be increased, and when the curing temperature is high, the curing time may be decreased.

According to another embodiment of the present invention, provided is a conductive material containing the silicone composite material described above.

The conductive material may be various, and may be a resin material that generally requires conductivity. For example, the conductive material may be applied to a contact portion requiring conductivity, such as an antistatic pad, a conductive fiber, a keyboard or a keypad. Generally, any material to which a silicone composite material using liquid silicone can be applied is applicable without any particular limitation.

EXAMPLES

Hereinafter, the present invention will be described in detail with reference to embodiments. However, the embodiments according to the present invention can be modified into various different forms, and the scope of the present invention should not be construed as being limited to the embodiments described below. The embodiments of the present invention are provided to more fully describe the present invention to those skilled in the art.

The initial viscosity of liquid silicone in Examples and Comparative Examples below are measured under the following conditions.

Initial Viscosity of Liquid Silicone (cP)

The viscosity was measured at a temperature of 25° C. in a parallel plate type having a plate diameter of 25 mm (400 um of gap between plates) using AR-2000 of TA Instrument Co., and the shear rate was measured under the commonly known condition of 10 $s^{-1}$ of experimental conditions of 0.1 to 1000 $s^{-1}$.

Example 1

Preparation of Conductive Rubber Composition

To liquid silicone having an initial viscosity of 5,000 cP and containing a platinum catalyst and silicone rubber, 1 part by weight of carbon nanotubes based on 100 parts by weight of the liquid silicone was added and mixed using a three-roll mill at a roll-to-roll speed ratio of 1:3.2:10 and a pressure of 4 bar, wherein the roll-mill mixing was repeated three times to prepare a first rubber composition, and to liquid silicone having an initial viscosity of 5,000 cP and containing a crosslinking agent and silicone rubber, 1 part by weight of carbon nanotubes based on 100 parts by weight of the liquid silicone was added and mixed in the same manner as in the preparation of the first rubber composition.

Manufacturing of Silicone Composite Material

The first rubber composition and the second rubber composition were mixed in a weight ratio of 1:1, and the mixed conductive rubber composition was heat-treated at 180° C. for 1 hour to cure the composition to prepare a silicone composite material.

Example 2

A silicone composite material was manufactured in the same manner as in Example 1 except that the initial viscosity of the liquid silicone included in the first rubber composition and the second rubber composition was 20,000 cP.

Example 3

A silicone composite material was manufactured in the same manner as in Example 1 except that the initial viscosity of the liquid silicone included in the first rubber composition and the second rubber composition was 30,000 cP.

Example 4

A silicone composite material was manufactured in the same manner as in Example 1 except that the initial viscosity of the liquid silicone included in the first rubber composition and the second rubber composition was 40,000 cP.

Example 5

A silicone composite material was manufactured in the same manner as in Example 1 except that the initial viscosity of the liquid silicone included in the first rubber composition and the second rubber composition was 90,000 cP.

Example 6

A silicone composite material was manufactured in the same manner as in Example 1 except that the content of the carbon nanotubes included in the first rubber composition and the second rubber composition was respectively 0.5 parts by weight based on 100 parts by weight of the liquid silicone.

Example 7

A silicone composite material was manufactured in the same manner as in Example 1 except that the content of the carbon nanotubes included in the first rubber composition and the second rubber composition was respectively 2 parts by weight based on 100 parts by weight of the liquid silicone.

Example 8

A silicone composite material was manufactured in the same manner as in Example 1 except that the content of the carbon nanotubes included in the first rubber composition and the second rubber composition was respectively 3 parts by weight based on 100 parts by weight of the liquid silicone.

Comparative Example 1

A silicone composite material was manufactured in the same manner as in Example 2 except that carbon black was added in the first rubber composition and the second rubber composition instead of the carbon nanotubes, wherein the content of the carbon black was 2 parts by weight based on 100 parts by weight of the liquid silicone.

Comparative Example 2

A silicone composite material was manufactured in the same manner as in Example 2 except that carbon black was added in the first rubber composition and the second rubber composition instead of the carbon nanotubes, wherein the content of the carbon black was 10 parts by weight based on 100 parts by weight of the liquid silicone.

Comparative Example 3

A silicone composite material was manufactured in the same manner as in Example 2 except that carbon black was added in the first rubber composition and the second rubber composition instead of the carbon nanotubes, wherein the content of the carbon black was 20 parts by weight based on 100 parts by weight of the liquid silicone.

Comparative Example 4

A silicone composite material was manufactured in the same manner as in Example 2 except that the carbon nanotubes were not added in the first rubber composition and the second rubber composition.

Experimental Example 1

The volume resistance of the silicone composite prepared in the examples and comparative examples was measured by the following method, and whether the value calculated according to Equation 1 below was reliable or not was confirmed.

$$y = \frac{A}{1 + (x/B)^C} + Dx + E \quad \text{[Equation 1]}$$

In Equation 1, x is the initial viscosity (cP) of the liquid silicone measured at a shear rate of 10 $s^{-1}$, y is the volume resistivity (Ωcm) of the silicone composite material measured at a voltage of 90 V on a 4-probe, A is −9,999,980, B is 45,000, C is a real number of 18 to 22, D is a real number of 0.001 to 0.0018, and E is 9,999,985.

Volume Resistance

The volume resistance was measured by applying a voltage of 90V using Loresta MCP-T600 of Mitsubishi Co., and a probe of 4-probe type was used. A volume resistance option was selected (ohm cm) to measure front and rear surfaces of a specimen by five times each and the average was recorded.

Error Rate

The error rate is the ratio of a calculated value to an experiment value (calculated value/experiment value), and when the error rate is close to 1, there is little error, and when the resistance is measured in the range, the error rate was calculated using the approximate median value.

TABLE 1

| | Experiment value | | Volume resistance calculation value | |
|---|---|---|---|---|
| | Initial viscosity (cP) | Volume resistance (Ωcm) | (Initial viscosity assignment) | Error rate |
| Example 1 | 5,000 | 9~12 | 10~14 | 1.1428 |
| Example 2 | 20,000 | 27~35 | 25~46 | 1.1290 |
| Example 3 | 30,000 | $10^3$~$10^4$ | 1.35 × $10^3$~6.85 × $10^3$ | 0.8000 |
| Example 4 | 40,000 | $10^5$~$10^7$ | 6.90 × $10^3$~1.08 × $10^3$ | 0.8500 |
| Example 5 | 90,000 | $10^6$~$10^8$ | 10~7 | 1.0000 |
| Comparative Example 1 | 20,000 | >$10^{13}$ | 25~46 | 0.0345 |
| Comparative Example 2 | 20,000 | $10^4$~$10^5$ | 25~46 | 0.0007 |
| Comparative Example 3 | 20,000 | 145~190 | 25~46 | 0.2083 |
| Comparative Example 4 | 20,000 | >$10^{13}$ | 25~46 | Converge to 0 |

Referring to Table 1, the measured initial viscosity of the liquid silicone was substituted into Equation 1 to derive a calculated value of volume resistance, and when compared the value with the measured volume resistance, it can be confirmed that all are at an equal level. That is, when the initial viscosity of liquid silicone is known, the volume resistance of a silicone composite material manufactured using the same may be easily predicted through Equation 1.

On the other hand, in the case of Comparative Examples 1 to 4 which do not follow the manufacturing method and the input raw materials of the present invention, it can be confirmed that Equation 1 was not satisfied, and from the result, it is confirmed that not all silicone composite materials satisfy the relationship of Equation 1 which the initial viscosity of liquid silicone which is a raw material and the volume resistance of a silicone composite material have.

TABLE 2

| | Experiment value | | Initial viscosity |
|---|---|---|---|
| | Initial viscosity (cP) | Volume resistance (Ωcm) | calculation value (Volume resistance assignment) |
| Example 1 | 5,000 | 9~12 | 2223~7000 |
| Example 2 | 20,000 | 27~35 | 12222~23542 |
| Example 3 | 30,000 | $10^3$~$10^4$ | 26896~32869 |
| Example 4 | 40,000 | $10^5$~$10^7$ | 34861~86886 |
| Example 5 | 90,000 | $10^6$~$10^8$ | 39829~9 × $10^9$ |
| Comparative Example 1 | 20,000 | >$10^{13}$ | Unable to calculate |
| Comparative Example 2 | 20,000 | $10^4$~$10^5$ | 30650~36516 |
| Comparative Example 3 | 20,000 | 145~190 | 23702~27224 |
| Comparative Example 4 | 20,000 | >$10^{13}$ | Unable to calculate |

Referring to Table 2, the measured volume resistance of the silicone composite material was substituted into Equation 1 to derive a calculated value of initial viscosity of the liquid silicone, and when compared the value with the measured initial viscosity, it can be confirmed that all actual values are at an equal level that is included in a calculated value range. That is, when the volume resistance of a silicone composite material product is confirmed, it is possible to predict the initial viscosity of liquid silicone which was used as a raw material of the silicone composite material, and it was confirmed that that a silicone composite material may be easily reproduced using the same through Equation 1.

On the other hand, in the case of Comparative Examples 2 and 3 which do not follow the manufacturing method and the input raw materials of the present invention, it can be confirmed that Equation 1 was not satisfied, and in the case of Comparative Examples 1 and 4, the resistance value was too great to be driven through calculation. From the result, it can be confirmed that not all silicone composite materials satisfy the relationship of Equation 1 which the initial viscosity of liquid silicone which is a raw material and the volume resistance of a silicone composite material have.

That is, when the initial viscosity of liquid silicone is between 5,000 and 90,000 cP, it is possible to easily predict the volume resistance of the silicone composite material manufactured therefrom. Furthermore, when the initial viscosity is 5,000 to 60,000 cP, or the upper limit value thereof is 30,000 cP or less, it can be also confirmed that the accuracy of Equation 1 is further increased.

That is, when Equation 1 is used, if the volume resistance of a composite is known, it is possible to predict the initial viscosity of liquid silicone to make the same product, so that it is possible to manufacture a silicone composite material with excellent reproducibility. When there is a target volume resistance of a composite, it was confirmed that it is possible to manufacture a silicone composite material having the target volume resistance by controlling the initial viscosity of liquid silicone.

Experimental Example 2

Performance Evaluation of Silicone Composite Material

The physical properties of the silicone composites prepared in the Examples and Comparative examples were measured and the results are shown in Table 3.

Tensile Elongation

Using UTM device of Instron Co., the cured silicon-CNT room temperature composite specimen was punched into the form of a tensile specimen (Dog-bone) of ASTM D412C, and the tensile elongation thereof was measured when pulled at a rate of 500 mm/min in a longitudinal direction.

TABLE 3

| | Initial viscosity (cP) | Volume resistance (Ωcm) | Tensile elongation (%) |
|---|---|---|---|
| Example 2 | 20,000 | 27~35 | 505 |
| Example 6 | 20,000 | $10^4$~$10^5$ | 545 |
| Example 7 | 20,000 | 6~9 | 435 |
| Example 8 | 20,000 | 1.0~1.9 | 365 |
| Comparative Example 1 | 20,000 | >$10^{13}$ | 520 |
| Comparative Example 2 | 20,000 | $10^4$~$10^5$ | 385 |
| Comparative Example 3 | 20,000 | 145~190 | 170 |

TABLE 3-continued

| | Initial viscosity (cP) | Volume resistance (Ωcm) | Tensile elongation (%) |
|---|---|---|---|
| Comparative Example 4 | 20,000 | $>10^{13}$ | 530 |

Referring to Table 3, it was confirmed that Examples 2, 6 to 8 have excellent tensile elongation while having low volume resistance, and in the case of Comparative Examples 1 and 4, since the resistance value is extremely high, it is expected that it is impossible to perform an appropriate antistatic function. In the case of Comparative Example 3 in which excess carbon black was contained, due to considerably poor elongation, it was confirmed that it was difficult to apply to applications requiring elasticity and in the case of Comparative Example 2, it was confirmed that the application thereof would be difficult considering both elongation and resistance.

The invention claimed is:

1. A method of manufacturing a silicone composite material having a predetermined volume resistance of 1 to $10^8$ Ωcm measured at a voltage of 90 V on a 4-probe, the method comprising:

determining an initial viscosity of a liquid silicone according to Equation 1 below;

mixing carbon nanotubes in the liquid silicone to form a conductive rubber composition; and curing the conductive rubber composition to form the silicone composite material having the determined initial viscosity:

$$y = \frac{A}{1 + (x/B)^C} + Dx + E \quad \text{[Equation 1]}$$

in Equation 1, x is the initial viscosity (cP) of the liquid silicone measured at a shear rate of 10 $s^{-1}$ and 25° C., y is the predetermined volume resistivity (Ωcm) of the silicone composite material measured at a voltage of 90 V on a 4-probe, A is −9,999,980, B is 45,000, C is a real number of 18 to 22, D is a real number of 0.001 to 0.0018, and E is 9,999,985.

2. The method of claim 1, wherein the conductive rubber composition comprises 100 parts by weight of the liquid silicone and 0.5 to 3 parts by weight of the carbon nanotubes.

3. The method of claim 1, wherein, in Equation 1, x is 5,000 to 90,000.

4. The method of claim 1, wherein the carbon nanotubes have a diameter of 5 to 100 nm and an aspect ratio of 5 to 10,000, and form secondary agglomerated carbon nanotubes by agglomerating non-linear state carbon nanotubes in which a graphite layer is stretched in a direction parallel to a fiber axis, and the secondary agglomerated carbon nanotubes have a diameter of 0.1 μm or greater, a length of 5 μm or greater, and a ratio of long diameter to short diameter of 5 or greater.

* * * * *